Oct. 12, 1926.
E. J. KINGSBURY
MOTION CONTROLLING MECHANISM
Original Filed May 5, 1919    2 Sheets-Sheet 1
1,602,907
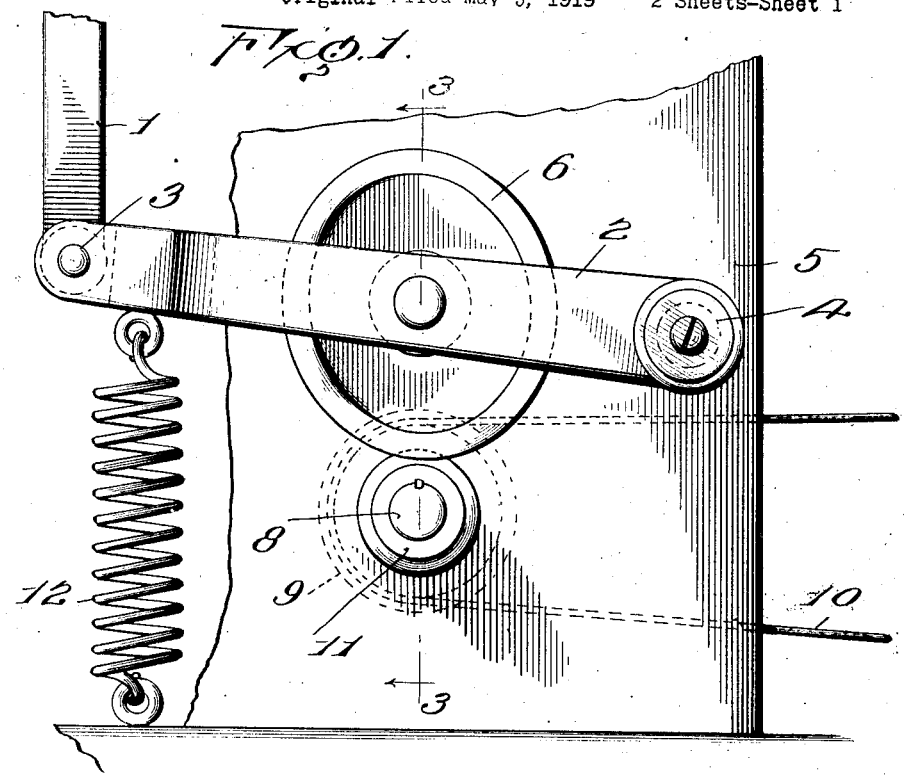
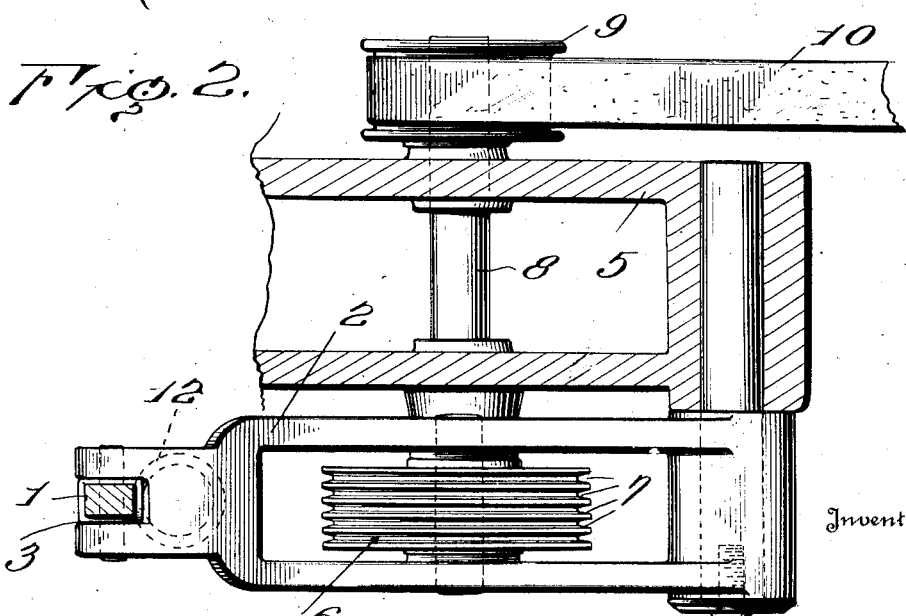
Inventor
By Edward J. Kingsbury
Sturtevant & Mason
Attorneys

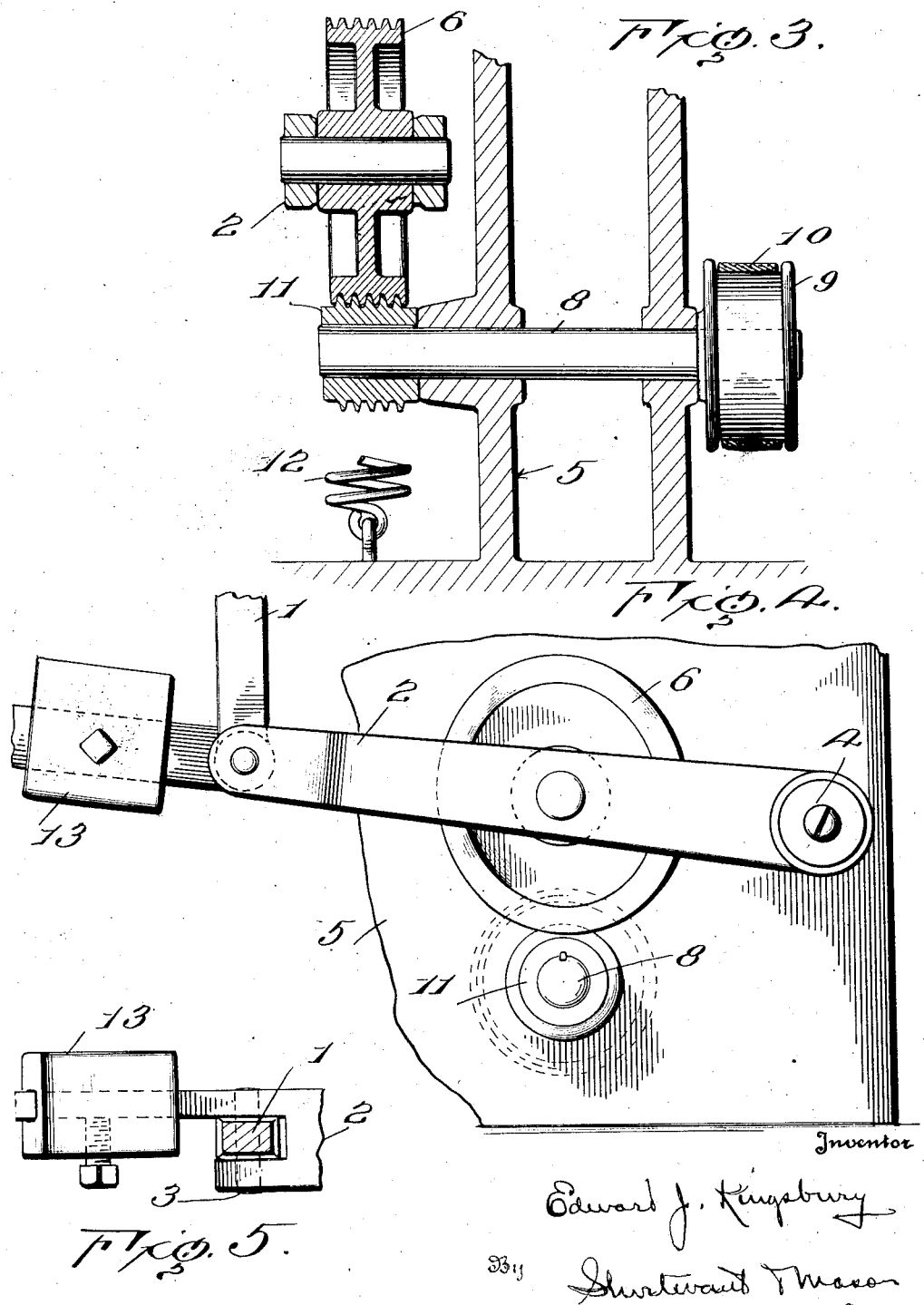

Patented Oct. 12, 1926.

1,602,907

UNITED STATES PATENT OFFICE.

EDWARD JOSLIN KINGSBURY, OF KEENE, NEW HAMPSHIRE.

MOTION-CONTROLLING MECHANISM.

Original application filed May 5, 1919, Serial No. 294,891. Divided and this application filed May 28, 1921. Serial No. 473,266.

My invention relates to new and useful improvements in motion controlling mechanisms, and is a division of my application filed May 5th, 1919, Serial No. 294,891.

The object of my invention is to maintain an even and steady pressure on the motion controlling mechanism to allow a steady predetermined movement thereof under normal conditions and prevent the rapid movement thereof under abnormal conditions.

Another object of my invention is to provide a device of the above character which is simple and durable, and having certain details of structure and combination of parts hereinafter more fully described.

In the accompanying drawings—

Figure 1 is a side elevation of my improved motion controlling mechanism, showing the employment of a spring;

Figure 2 is a top plan view of Figure 1;

Figure 3 is a vertical transverse sectional view taken on the line 3—3 of Figure 1;

Figure 4 is a side elevation of the cam carrying lever partly broken away, showing a weight employed instead of the spring;

Figure 5 is a top plan view of Figure 4, partly broken away.

Referring now to the drawings, 1 represents a member, the motion or movement of which in either direction is to be controlled and which is connected to the lever 2 at 3. This is shown as a pivotal connection, but it may be rigid in the application of this mechanism to certain devices or machines. The lever 2 is pivotally connected at 4 to the base or frame 5 which may be of any desired character, and, as shown in Figure 1, is partly broken away to more fully show the operating mechanism.

The lever 2, intermediate its ends, has rotatably mounted thereon the cam 6 which has its outer face provided with a series of peripheral grooves 7, the walls of which converge or taper, as fully shown in Figure 3 of the drawings.

The base or frame 5 is provided with a shaft 8, which carries a pulley 9 at one end and over which passes the continuously driven belt 10, so that the shaft 8 is continuously rotated. The opposite end of the shaft is provided with a wheel 11 and its outer face has a series of peripheral ridges which are wedge-shape in cross section to correspond with the grooves 7 in the periphery of the cam 6, and are adapted to extend into the same, as shown in Figure 3 of the drawings.

Connected to the outer free end of the lever 2 is a spring 12 which draws the lever 2 down, so that the cam 6 frictionally engages the wheel 11 and the movement of the lever is limited.

In Figure 4, instead of the spring 12, I employ the weight 13, which normally holds the lever 2 down, so that the cam 6 is in engagement with the wheel 11.

In operation, the member 1 is either the device of which motion is to be controlled, or may be connected thereto. The spring 12 normally holds the lever 2 down, so that the cam 6 is in engagement with the wheel 11 and the grooved connection gives a greater friction surface. As the member 1 moves the spring still retains the cam 6 on the wheel 11, the same being continuously rotated, and the cam is slowly rotated to allow the gradual downward movement of the lever 2 under the tension of the spring or weight. Should this member 1 cease to move for any reason, the spring would not draw the lever down, but there would be a slipping action between the wheel 11 and the cam 6 until the member 1 had again started to move, when the movement of the lever 2 would be controlled by the cam.

Having thus described my invention, what I claim as new and desire to secure by Letters Patent, is:—

1. A motion controlling mechanism comprising a movable member, yielding means for imparting movement to said member, and a friction driven controlling device for positively regulating the advance movements of said movable member.

2. A motion controlling mechanism comprising a movable member, yielding means connected to said member, and a friction driven controlling device for positively regulating the advance of said movable member.

3. A motion controlling mechanism comprising a movable member, a pivoted yielding lever connected to said member, and a friction driven controlling device for positively regulating the advance of said lever for regulating the movement of said movable member.

4. A motion controlling mechanism comprising a movable member, a pivoted yielding lever connected to said member, and a friction driven cam carried by the lever for positively regulating the advance of said lever for regulating the movement of said movable member.

5. A motion controlling mechanism comprising a movable member, a pivoted yielding lever connected to said member, a cam rotatably carried by the lever, and a continuously driven wheel engaging the cam for driving the same and positively regulating the advance of said lever for regulating the movement of said movable member.

6. A motion controlling mechanism comprising a movable member, a pivoted yielding lever connected to said member, a cam rotatably carried by the lever and having peripheral grooves in its periphery, and a continuously driven wheel having peripheral projections entering the grooves in the cam for driving the same and positively regulating the advance of said lever for regulating the movement of said member.

7. A motion controlling mechanism comprising a movable member, a pivoted yielding lever connected to said member, a cam rotatably carried by the lever and having peripheral tapering grooves in its periphery, and a continuously driven wheel having peripheral tapering projections entering the grooves in the cam for driving the same and positively regulating the advance of said lever for regulating the movement of said member.

8. A motion controlling mechanism comprising a movable member, a pivoted yielding lever connected to said member, a cam carried by the lever, and a continuously driven wheel engaging the cam for driving the same and positively regulating the advance of said lever for regulating the movement of said member and to allow a slipping between the wheel and cam when the movable member is not in motion.

9. A motion controlling mechanism comprising a movable member, a lever pivoted at one end and its opposite end connected to the movable member, yielding means for said lever, a cam rotatably carried by the lever intermediate its ends and having peripheral tapering grooves in its periphery, and a continuously driven wheel with tapering peripheral projections entering the grooves in the cam for driving the same and positively regulating the advance of said lever for regulating the movement of the lever.

In testimony whereof, I affix my signature.

EDWARD JOSLIN KINGSBURY.